US011418422B1

(12) United States Patent
Dabbagh et al.

(10) Patent No.: US 11,418,422 B1
(45) Date of Patent: Aug. 16, 2022

(54) RECEIVED-SIGNAL RATE DETECTION

(71) Applicant: MELLANOX TECHNOLOGIES, LTD., Yokneam (IL)

(72) Inventors: Amir Dabbagh, Haifa (IL); Eran Notkin, Nahalal (IL); Albert Gorshtein, Ashdod (IL); Nir Sheffi, Rehovot (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 48 days.

(21) Appl. No.: 17/169,591

(22) Filed: Feb. 8, 2021

(51) Int. Cl.
*H04L 43/0888* (2022.01)
*H04L 47/11* (2022.01)
*H04L 47/10* (2022.01)
*H04L 43/0811* (2022.01)
*H04L 25/02* (2006.01)
*H04L 43/16* (2022.01)

(52) U.S. Cl.
CPC ...... *H04L 43/0888* (2013.01); *H04L 25/0262* (2013.01); *H04L 43/0811* (2013.01); *H04L 43/16* (2013.01); *H04L 47/11* (2013.01)

(58) Field of Classification Search
CPC . H04L 25/0262; H04L 43/0811; H04L 43/16; H04L 47/11; H04L 43/0888; H04L 43/0894
See application file for complete search history.

(56) References Cited

U.S. PATENT DOCUMENTS

| | | | | |
|---|---|---|---|---|
| 6,088,347 A * | 7/2000 | Minn | ............... | H04J 13/0048 370/441 |
| 6,112,325 A * | 8/2000 | Burshtein | ............ | H04L 1/0046 714/780 |
| 6,359,925 B1 * | 3/2002 | Schilling | ............... | H04L 1/0047 714/751 |
| 6,359,934 B1 * | 3/2002 | Yoshida | ............... | H04L 1/0047 370/234 |
| 6,393,074 B1 * | 5/2002 | Mandyam | ............ | H04L 1/0059 714/795 |
| 6,480,556 B1 * | 11/2002 | Guey | .................... | H04L 1/0046 375/225 |
| 6,687,233 B1 * | 2/2004 | Chen | ........................ | H04L 1/08 375/225 |
| 6,708,239 B1 * | 3/2004 | Ellerbrock | ....... | H04L 12/40032 710/72 |
| 7,000,031 B2 * | 2/2006 | Fischer | .................... | H04L 1/18 709/248 |
| 7,809,090 B2 * | 10/2010 | Dominique | ........... | H04B 1/707 370/465 |

(Continued)

OTHER PUBLICATIONS

Goertzel, "An Algorithm for the Evaluation of Finite Trigonometric Series," American Mathematical Monthly, vol. 65, No. 1, pp. 34-35, Jan. 1958.

(Continued)

*Primary Examiner* — James M Perez
(74) *Attorney, Agent, or Firm* — Kligler & Associates Patent Attorneys Ltd

(57) ABSTRACT

A rate Detection Apparatus (RDA) includes a power spectral density (PSD) estimator and a rate selector. The PSD estimator is configured to receive samples of a signal, and to estimate a PSD of the signal. The rate selector is configured to identify a transmission rate of the signal responsively to the estimated PSD.

22 Claims, 4 Drawing Sheets

(56) References Cited

U.S. PATENT DOCUMENTS

| | | | | |
|---|---|---|---|---|
| 7,813,381 | B2* | 10/2010 | Chang | H04L 25/0262 370/503 |
| 7,962,826 | B2* | 6/2011 | Sutivong | H04W 52/146 714/748 |
| 8,452,316 | B2* | 5/2013 | Sutivong | H04W 52/20 455/69 |
| 8,675,751 | B2* | 3/2014 | Cannon | H04L 27/3461 375/325 |
| 8,675,794 | B1* | 3/2014 | Perets | H04W 72/0413 375/264 |
| 8,861,662 | B1* | 10/2014 | Perets | H04W 72/0413 375/264 |
| 9,379,926 | B2* | 6/2016 | Berretta | H04L 5/04 |
| 9,596,017 | B1* | 3/2017 | Mayrench | H04L 5/0028 |
| 9,768,914 | B2* | 9/2017 | Levy | H04L 25/03292 |
| 10,200,071 | B1* | 2/2019 | Pearce | H04B 7/18519 |
| 10,225,147 | B2* | 3/2019 | Ginis | H04L 43/0894 |
| 10,237,014 | B1* | 3/2019 | Dabbagh | H04L 1/1829 |
| 10,381,797 | B1* | 8/2019 | Ryba | H01S 3/0078 |
| 10,594,520 | B2* | 3/2020 | Chiskis | H04B 1/0475 |
| 10,637,693 | B1* | 4/2020 | Cohen | H04L 25/03 |
| 10,659,188 | B2* | 5/2020 | Dabbagh | H04L 1/0009 |
| 10,707,915 | B2* | 7/2020 | Liu | H04B 1/7143 |
| 10,764,095 | B1* | 9/2020 | Kedar | H04B 1/16 |
| 2004/0196912 | A1* | 10/2004 | Del Toso | H04L 27/2602 375/242 |
| 2005/0123027 | A1* | 6/2005 | Cioffi | H04L 1/0002 375/222 |
| 2006/0034406 | A1* | 2/2006 | Lee | H04L 7/0062 375/355 |
| 2006/0098725 | A1* | 5/2006 | Rhee | H04L 41/0856 375/222 |
| 2006/0146922 | A1* | 7/2006 | Modlin | H04L 5/0044 375/222 |
| 2006/0171347 | A1* | 8/2006 | Attar | H04W 72/1263 370/328 |
| 2006/0198430 | A1* | 9/2006 | Rhee | H04M 11/062 375/222 |
| 2007/0133787 | A1* | 6/2007 | Verlinden | H04B 17/345 379/417 |
| 2008/0233964 | A1* | 9/2008 | McCoy | H04L 1/0003 455/450 |
| 2009/0191910 | A1* | 7/2009 | Athalye | H04W 52/367 455/522 |
| 2010/0029320 | A1* | 2/2010 | Malladi | H04B 7/0404 375/261 |
| 2010/0056197 | A1* | 3/2010 | Attar | H04W 52/241 455/522 |
| 2012/0033720 | A1* | 2/2012 | Brunel | H04B 15/04 375/225 |
| 2013/0121348 | A1* | 5/2013 | Zhang | H04L 27/2602 370/474 |
| 2013/0201853 | A1* | 8/2013 | Perets | H04W 24/00 370/252 |
| 2013/0238954 | A1* | 9/2013 | Jang | H04L 5/0053 714/758 |
| 2014/0205026 | A1* | 7/2014 | Smaini | H04B 3/56 375/257 |
| 2015/0043926 | A1* | 2/2015 | Levy | H04L 25/03292 398/202 |
| 2016/0285536 | A1* | 9/2016 | Gutierrez | H04L 1/0039 |
| 2018/0066961 | A1* | 3/2018 | Trusov | G01C 25/005 |
| 2018/0323902 | A1* | 11/2018 | Rico Alvarino | H04L 1/0004 |
| 2019/0028230 | A1* | 1/2019 | Dabbagh | H04B 7/0413 |
| 2019/0182010 | A1* | 6/2019 | Dabbagh | H04L 1/0015 |
| 2019/0342828 | A1* | 11/2019 | Shellhammer | H04L 27/361 |

OTHER PUBLICATIONS

Infiniband Trade Association, "InfiniBandTM Architecture Specification", vol. 1, Release 1.3, pp. 1-1842, Mar. 3, 2015.

* cited by examiner

RECEIVED-SIGNAL RATE DETECTION

FIELD OF THE INVENTION

The present invention relates generally to high-speed digital signal transmission, and particularly to the detection of signal bitrate.

BACKGROUND OF THE INVENTION

In some communication networks, the receiver automatically detects the characteristics of a received signal.

For example, U.S. Pat. No. 7,813,381 discloses automatic data rate detection systems and methods, including a system that includes a clock and data recovery circuit embodied in a first integrated circuit, the clock and data recovery circuit being configured to re-clock a data stream and an automatic rate detection system that is embodied in a second integrated circuit, where the first integrated circuit is in data communication with the second integrated circuit, and the automatic rate detection system is configured to determine a data rate of the data stream upon identifying a transition in the data rate of the data stream based upon the state of the at least one status flag received from the clock and data recovery circuit.

U.S. Pat. No. 6,112,325 discloses a device for determining the rate of a received communication frame, including a plurality of encoded signal quality estimators, each at a different rate, a decision controller, connected to the encoded signal quality estimators, a decoder connected to the controller and an erasure detection unit connected to the decoder and the controller, wherein each of the quality estimators processes the received encoded frame according to an encoded signal quality criteria, thereby producing a quality value, and, wherein the controller selects the rate with the best quality value, the decoder decodes the encoded frame according to the selected rate and the erasure detection unit analyzing the decoded frame, thereby determining it as allowed or as erased.

SUMMARY OF THE INVENTION

An embodiment of the present invention that is described herein provides a rate Detection Apparatus (RDA) including a power spectral density (PSD) estimator and a rate selector. The PSD estimator is configured to receive samples of a signal, and to estimate a PSD of the signal. The rate selector is configured to identify a transmission rate of the signal responsively to the estimated PSD.

In some embodiments, the PSD estimator is configured to estimate the PSD of the signal in multiple frequency slices that correspond at least to multiple expected transmission rates, and the rate selector is configured to select the transmission rate of the signal from among the expected transmission rates.

In some embodiments, the PSD estimator is further configured to estimate the PSD of the signal in one or more additional frequency slices that do not correspond to any of the expected transmission rates, and the rate selector is configured to select the transmission rate depending on the PSD estimated in the one or more additional frequency slices. In an example embodiment, the PSD estimator is configured to evaluate the one or more additional frequency slices for one or more of the expected transmission rates that are characterized by an insertion loss exceeding a defined threshold. In a disclosed embodiment, the PSD estimator is configured to specify the one or more additional frequency slices, for a given expected transmission rate, to one or more highest harmonics of the given expected transmission rate that fall below a Nyquist rate of the received signal.

In another embodiment, the rate selector is further configured to identify a physical-layer (PHY) protocol of the signal based on the identified transmission rate. In yet another embodiment, the PSD calculator is configured to estimate a Peak-to-Average Power Ratio (PAPR) of the signal in at least one of the frequency slices, and the rate selector is configured to identify the transmission rate depending on the PAPR.

In some embodiments, the PSD estimator includes multiple Goertzel filters, each configured to receive power samples of the signal and to output the power samples filtered around a respective frequency. In an embodiment, the rate selector is configured to identify the transmission rate responsively to a comparison among outputs of the Goertzel filters.

In a disclosed embodiment, the PSD estimator includes multiple PSD calculators, each configured to receive power samples filtered around a respective frequency and to output an estimate of the PSD at the respective frequency. In another embodiment, the PSD estimator is configured to estimate the PSD over a measurement time period, and the RDA further includes a phase error injection circuit configured to insert phase noise into the signal during the measurement time period. In an embodiment, the rate selector is configured to identify that the transmission rate is higher than a Nyquist rate of the signal.

There is additionally provided, in accordance with an embodiment of the present invention, a rate detection method including receiving samples of a signal, and estimating a Power Spectral Density (PSD) of the signal. A transmission rate of the signal is identified responsively to the estimated PSD.

The present invention will be more fully understood from the following detailed description of the embodiments thereof, taken together with the drawings in which:

DETAILED DESCRIPTION OF EMBODIMENTS

Overview

Figure 1:
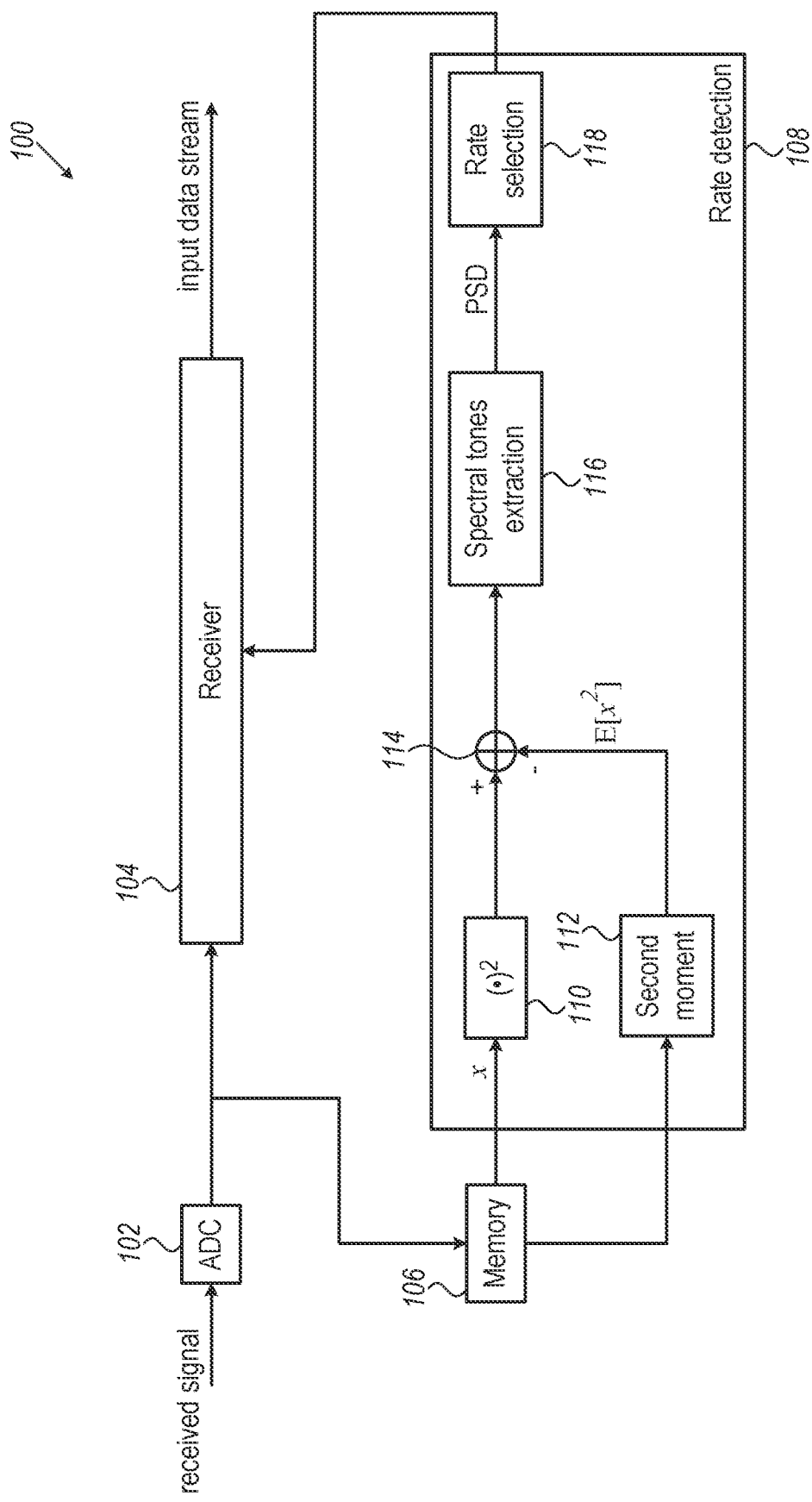
FIG. 1 is a block diagram that schematically illustrates the structure of a rate detection apparatus, in accordance with an embodiment of the present invention.

Communication networks may sometimes use a variety of frequencies, modulation schemes, baud-rates and bitrates (collectively referred to hereinbelow as communication rates). In some applications, an auto-negotiation session may take place between network devices that are connected to the network, in which the transmitter and the receiver interrogate each other's capabilities and set a suitable communication rate. In other applications, the receiver automatically detects the transmission rate from a group of possible communication rates.

Measuring the power spectrum of the received signal may provide valuable information required for the automatic detection of the transmitted baud-rate (which, in many applications, has a one-to-one correspondence with the communication protocol); however, two issues complicate the detection of the transmitted protocol by observing the power spectrum of the received signal. The first issue is that harmonics of a lower-frequency protocol may be observed in a higher-frequency protocol when the higher frequency is an integer multiple of the lower frequency (which is the case in some applications, e.g., InfiniBand™). The second issue is insertion loss—transmission media typically attenuate the signal level; the attenuation is typically not equal across the frequency spectrum, and protocols that use frequencies near the end of the supported band are typically attenuated far more than relatively lower frequencies.

Automatic detection of the transmission protocol could in principle be done using a plurality of Clock Data Recovery (CDR) circuits, each CDR configured to detect one of a preset group of protocols; decoding the received data in each CDR; and, checking for data validity, e.g., by checking a Cyclic-Redundancy-Check (CRC) code that may be embedded in the received data. Such method, however, is both slow and, in terms of required hardware resources and power consumption, expensive.

Embodiments of the present invention that are disclosed herein provide methods and apparatuses for automatic rate detection of a received communication signal. The disclosed techniques may be used in network devices such as switches, host-channel adapters and others that are required to automatically detect a transmission rate. In some embodiments, a rate-detecting receiver comprises an analog to digital converter (ADC) that converts received analog signals to digital samples at a conversion frequency Fs. The rate-detecting receiver further comprises a rate detection apparatus (RDA).

In an embodiment, the transmitter may transmit data in one of a plurality of communication rates, and the RDA is configured to select a most likely input rate (in embodiments, each communication rate corresponds to a unique transmission frequency). In an embodiment, the input frequencies that the receiver may receive are below the Nyquist frequency, which is equal to half the ADC conversion frequency; in another embodiment the input frequencies may comprise a frequency that is beyond the Nyquist frequency.

In an embodiment, the RDA comprises band-pass filters that filter the power spectral density of the received signal in a series of frequency slices, which are centered about the signal frequencies that the rate-detecting receiver is expected to receive (denoted Fvalid). In some embodiments, the series of frequency bands also covers one or more additional frequencies, which are not expected to be received but may be useful in confronting the effects of two phenomena: insertion loss (IL), or the drop in received power at high frequencies, and frequency ambiguity, which may occur when two receive frequencies are multiples of each other. As the sequence length that typical bandpass filters require for frequency analysis is relatively small, rate detection may be rapidly achieved, after a small number of signal samples is acquired.

In some embodiments, the list of frequencies to be analyzed Fanalysis is defined for each frequency Fi∈Fvalid; in embodiments, the list may comprise, in addition to Fi, other frequencies of Fvalid, and, in embodiment, the list may comprise one or more extended frequencies.

In some embodiments, the RDA calculates the power-spectral density using a group of Goertzel filters and Power Spectral Density (PSD) calculators, which calculate the power in the respective frequency bands from the outputs of the Goertzel filters. (For Goertzel filters and Goertzel algorithms background, see "An Algorithm for the Evaluation of Finite Trigonometric Series," Goertzel (January 1958), American Mathematical Monthly, 65 (1): 34-35.) Each of the Goertzel filters may be tuned to one of Fvalid frequencies or to one of the extended frequencies.

According to an embodiment, the RDA selects the most likely received frequency responsive to the PSD, using a flowchart that will be described below.

Thus, according to embodiments of the present invention, a rate detection receiver may detect the input rate rapidly, using digital circuits and computations (in addition to a mixed-signal ADC). As would be appreciated, in some embodiments each PHY protocol that may be used by the transmitter is characterized by a different rate, and, hence, detecting the input rate also identifies the PHY protocol.

The disclosed rate-detection techniques can be used in any suitable receiver that receives digital signals. One example application is a receive port of a network device. A network device may comprise, for example, a network adapter such as an Ethernet Network Interface Controller (NIC), an Infiniband Host Channel Adapter (HCA), a Data Processing Unit (DPU) or "Smart-NIC", a network-enabled Graphics Processing Unit (GPU), or any other suitable network device. Alternatively, the disclosed techniques can be used for rate detection in other sorts of receivers that detect digital signals, such as receivers of various wireless protocols, receivers of test equipment, and the like.

System Description

FIG. 1 is a block diagram that schematically illustrates the structure of a Rate-Detecting Receiver 100, in accordance with an embodiment of the present invention. Receiver 100 can be used, for example, in a receive port of a network device such as a network adapter or switch, for identifying the baud rate of an incoming signal.

The set of frequencies corresponding to all the transmission rates that the Rate-Detecting Receiver may receive is referred to as Fvalid. As will be described below, to reliably detect the transmission rate, the Rate-Detecting Receiver may analyze additional frequencies; the set comprising both Fvalid and the additional frequencies will be referred to as Fextended.

The number of frequencies in Fvalid (number of set members) will be referred to as Nvalid, and the number of extended frequencies in Fextended will be referred to as Nextended. In some embodiments, Nvalid=13 whereas Nextended=14.

The rate-detecting receiver comprises an Analog to Digital Converter (ADC) 102, which is configured to convert the analog input signal to a digital signal, and a "Regular Receiver" 104, which is configured to receive an input-rate indication and, responsively, decode the digital signal, generating a stream of decoded input data. (We use the term "Regular Receiver" to denote any receiver used in the art that does not comprise a rate detection circuitry; such receivers are typically configured to receive a single-rate signal, or one of a plurality of signal rates, wherein the rate is indicated by an external circuitry.)

For brevity, we will refer hereinbelow to digital signals, comprising a sequence of digital samples of an amplitude of the corresponding analog signal, as "signals"; we will use the term "power signal" to indicate sequences of digital samples of the power of a signal.

The rate Fs in which the analog signal is sampled by ADC 102 will be referred to as the "sampling rate" or the "sampling frequency" hereinbelow. We will also use the term "Nyquist Frequency" to denote half the sampling frequency. The Nyquist frequency sets the maximum signal frequency that can be directly detected (according to Nyquist-Shannon sampling theorem) and will also be referred to as the "Nyquist Limit" (in the description hereinbelow we will disclose an embodiment that indirectly detects a rate which is beyond the Nyquist limit).

Rate-detecting receiver 100 further comprises a Memory 106, which is configured to store the signal generated by ADC 102, and a Rate Detection Apparatus (RDA) 108, which is configured to automatically detect the signal baudrate and indicate the rate to receiver 104. In some embodiments, memory 106 collects groups of signal samples, which will be referred to as "blocks", wherein the block length is equal to or greater than the number of samples required for spectral tone extraction (spectral tone extraction and the required number of samples will be described below). In other embodiments, memory 106 is configured to collect a plurality of blocks. In an example embodiment, the block length is 2000 samples, and memory 106 collects four such blocks. We will refer below to the block length as BlockLen, and to the number of blocks that memory 106 collects as NumOfBlocks.

RDA 108 comprises a power estimation circuit 110, which is configured to derive the power of the signal by squaring the signal samples stored in memory 106; a Second Moment circuit 112, which is configured to calculate an average power of the signal; a signal subtractor 114, which is configured to subtract the average power of the signal from the power of the signal (in order to suppress the common DC tone and the amplification of the nearby frequencies), a spectral-tone extractor (STE) 116, comprising a plurality of filters and configured to calculate a Power-Spectral Density (PSD) of the signal at a predefined set of frequencies; and, a Rate Selection circuit 118, which is configured to select a signal rate from the given set of rates corresponding to Fvalid, according to the power levels of the signal at the predefined set of frequencies.

In some embodiments, the STE is configured to calculate the power density at Nvalid frequencies, corresponding to the set of Fvalid possible signal frequencies. In an embodiment, the highest frequency of Fvalid is beyond the Nyquist limit and, therefore, its power cannot be calculated by the STE. We will refer below to the number of frequencies that the STE supports (that is—computes the PSD of) as K; in some embodiments K=Nvalid and in other embodiments K=Nvalid−1.

In embodiments, Second Moment circuit 112 is configured to calculate the average power of each block of signal samples; in other embodiments, the Second Moment circuit is configured to find an average power of a group of blocks. In embodiments, the second moment may be stable, and the second moment circuit is configured to calculate the second moment only upon power up and/or upon a trigger input that the second moment circuit receives (e.g., from a CPU).

STE 116 is configured to estimate the signal power at the set Fextended, which includes frequencies corresponding to the expected set of rates, and additional frequencies (as will be explained below). In embodiments, the STE comprises a Discrete Fourier Transform (DFT) circuit, which is degenerated to transform only the frequency bands of interest; in other embodiments the STE comprises a set of tuned bandpass filters, e.g., Goertzel filters. The number of samples that the STE requires (BlockLen) is typically derived from the filter characteristics (e.g., from the bandwidth of the filters). In some embodiments, the STE receives NumOfBlocks blocks, each with BlockLen samples, to reduce the probability of false detection.

Rate Selection circuit 118 executes an algorithm that determines the most likely rate of the input signal according to the signal power at the predefined set of frequencies. In some embodiments, the expected false detection error rate may be less than $10^{-3}$ to $10^{-4}$ when the insertion loss of the channel is up to 60 dB at the Nyquist frequency.

In summary, according to the example embodiment illustrated in FIG. 1, Rate-Detecting Receiver 100 comprises an RDA, which receives the input signal from a memory; the rate detection circuitry calculates a PSD of the input signal, and then detects the energy in a set of predefined frequencies, including frequencies from the set Fvalid, the frequencies corresponding to the expected set of signal rates, and additional frequencies. A Rate selection circuit then selects a most likely baud rate of the input signal, with high accuracy.

As would be appreciated, the structure of rate-detecting receiver 100 described above is cited by way of example. Embodiments of a rate-detecting receiver in accordance with the disclosed techniques are not limited to the description hereinabove. Elements of RDA 108 may be implemented in software, in hardware or by combination of hardware and software.

Spectral Tone Extraction

STE 108 is configured to compute the PSD of the received signal at a given set of frequencies. As described above, the input to the STE is one or more BlockLen sequences of samples y(n), wherein each sample is equal to the difference between the PSD and a PSD average:

$$y(n) = x^2(n) - E[x^2]$$

Note that the value of the second moment $E[x^2]$ is calculated over an entire block of BlockLen y(n) samples that are derived from a corresponding block of BlockLen samples of the input signal; in some embodiments, the second moment may be calculated over a plurality of blocks. In an embodiment, $E[x^2]$ is calculated once during power-up, or upon a trigger that the second moment circuit may receive.

Figure 2:
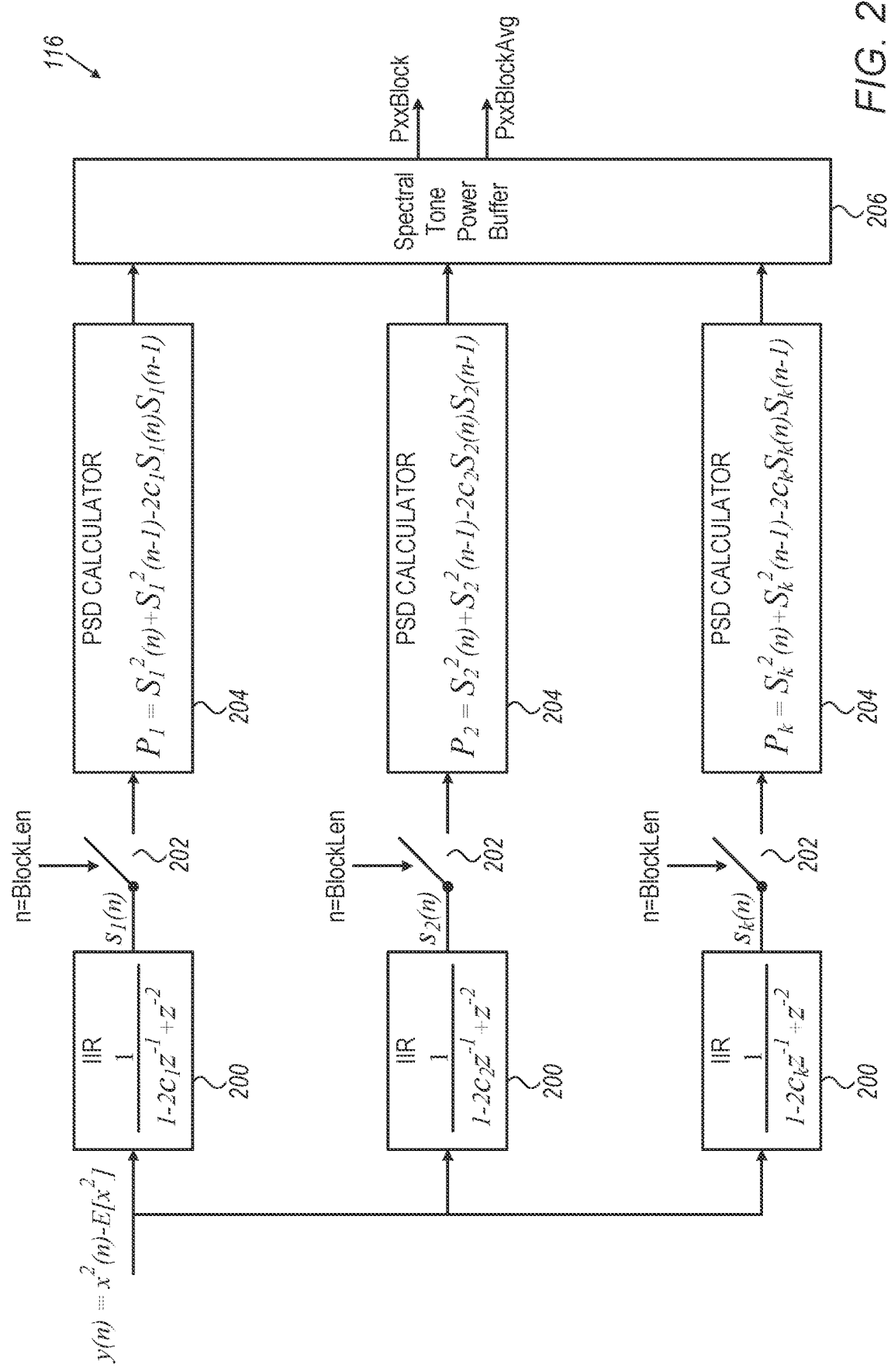
FIG. 2 is a block diagram that schematically illustrates the structure of a spectral-tone extractor in the apparatus of FIG. 1, in accordance with an embodiment of the present invention.

FIG. 2 is a block diagram that schematically illustrates the structure of STE 116 (FIG. 1), in accordance with an embodiment of the present invention. The STE comprises N Infinite Impulse Response (IIR) filters 200, N switches 202, N PSD Calculators 204, and a Spectral Tone-Power buffer 206.

According to the example embodiment illustrated in FIG. 2, IIR filters 200 comprise Goertzel filters, having the following transfer function:

$$S_i(n) = \frac{1}{1 - 2C_i Z^{-1} + Z^{-2}}$$

wherein $C_i$ are the Goertzel coefficients, set according to the filter frequency. In some embodiments, the Goertzel coefficients $C_i$ are pre-calculated according to:

$$c_i = \cos(2\pi f_i / F_s)$$

wherein $f_i$ is the filter frequency (the $i^{th}$ element of Fextended) and Fs is the sampling frequency.

Switches 202 are configured to forward the last two values generated by each IIR filter (e.g., $S_i(n-1)$ and $S_i(n)$) to the corresponding PSD calculators, wherein n and n−1 are the last two calculated S values for each block of power samples.

PSD calculators 204 are configured to calculate the power spectral density (PSD) of each frequency Pi, according to the following formula:

$$P_i = S_i^2(n) + S_i^2(n-1) - 2C_i S_i(n) S_i(n-1)$$

wherein $S_i$ are the outputs of the respective Goertzel filters and $C_i$ are the Goertzel filter coefficients.

Spectral Tone-Power buffer 206 receives groups of Pi signals, each group comprising N values (each value corresponding to a single frequency), and temporarily stores one or more groups. In an embodiment, Spectral Tone-Power buffer 206 is configured to store data corresponding to NumOfBlocks groups (e.g., four groups). The output of Spectral Tone-Power buffer 206 comprises: i) Power Values—NumOfBlocks PxxBlock vectors, each vector comprising N power values of the N frequencies; and ii) PxxBlockAvg—an—N-size vector, denoting the average power of each frequency, over the NumOfBlocks blocks.

In some embodiments, to guarantee the existence of at least one segment with good sampling phase, an artificial ppm-error is injected into the system by an additional circuitry configured to inject random errors. In an embodiment the additional circuitry comprises a degenerated Clock Recovery Unit (CRU).

As would be appreciated, the structure of STE 116 described above is cited by way of example. Spectral-Tone Extraction circuits according to the present invention are not limited to the description hereinabove. For example, in alternative embodiments different types of IIR filters may be used.

Rate Selection

According to embodiments of the present invention, the power values in each of the blocks and the average power values over NumOfBlock blocks, for each of the N frequencies, are input to a Rate-Selection circuit 118 (FIG. 1). In embodiments, the group of allowed transmission rates comprises thirteen rates:

TABLE 1

Infiniband baud rates

| PHY Protocol | Baud Rate (GBd) |
|---|---|
| 100G/NDR | 53.125 |
| 50G/HDR | 26.5625 |
| 25G/EDR | 25.78125 |
| FDR-20 | 20.6250 |
| FDR | 14.0625 |
| FDR-10 | 10.3125 |
| QDR | 10 |
| FDR-5 | 5.15625 |
| DDR | 5 |
| FDR-2.5 | 3.125 |
| SDR | 2.5 |

TABLE 1-continued

Infiniband baud rates

| PHY Protocol | Baud Rate (GBd) |
|---|---|
| FDR-1 | 1.25 |
| DME | 0.3125 |

Some of the transmission rates in the above table are defined by the InfiniBand™ specifications, e.g., in "InfiniBand™ Architecture Specifications," Volume 2, Release 1.3.1, chapter 6.8.

In the example embodiments to be described hereinbelow, the sampling frequency Fs in which ADC 102 is sampled equals to the NDR frequency of 53.125 GHz (and, hence, the Nyquist limit equals 26.5625 GHz). The STE detects a frequency from a set of frequencies Fextended, comprising the expected set of frequencies shown in the table above, except for the NDR 53.125 G frequency and with the addition of an extended frequency (25 GHz):

Fextended=[0.3125,1.25,2.5,3.125,5,5.15625,10, 10.3125,14.0625,20.625,25.78125,26.5625,25] GHz.

To check if the received signal frequency is a Fi (Fi∈Fvalid), the RDA analyses the PSD of the signal at a set of frequencies which includes the corresponding frequency and may include other frequencies of Fextended, as shown in the following PSD Analysis Frequencies table below (each entry i of the table comprises a set of frequencies to be analyzed, which will be referred to as Fanalysis(i)):

TABLE 2

PSD Analysis Frequencies

| Detected Protocol | PSD analysis frequencies |
|---|---|
| DME | [PDME, P1G, PSDR, P2P5G, PDDR, PQDR, P10G, PFDR, PEXT, PHDR] |
| 1G | [P1G, PSDR, PDDR, PQDR, PEXT] |
| SDR | [PSDR, PDDR, PEXT] |
| 2.5G | [P2P5G, PEXT] |
| DDR | [PDDR, PQDR, PEXT] |
| 5G | [P5G, P10G] |
| QDR | PQDR |
| 10G | P10G |
| FDR | PFDR |
| 20G | P20G |
| 25G | PEDR |
| HDR | PHDR |

(Note that the highest rate, NDR, is beyond the Nyquist limit and cannot be directly detected; NDR is detected by default, as will be described below.)

The set of frequencies Fanalysis(i), to be analyzed for each signal frequency Fi, includes the PSD values of all PHY protocols with frequency that is an integer multiple of Fi. For example, in SDR, the DDR and the extended frequency are an integer multiple of the SDR frequency. Hence, part of the power of a received SDR signal is detected by the DDR filter (this phenomenon will be referred to as frequency selection ambiguity).

The extended frequency, which is used for the detection of a plurality of transmission frequencies, is set to serve the following two purposes: i) help resolve the frequency selection ambiguity (for example, SDR may be selected when Psdr, Pddr, and Pext are significantly above PxxAvg); and ii) improve performance robustness in channels with significant insertion loss (IL) near the HDR Nyquist frequency. As shown in the table above, the extended tone frequency is set near the highest supported frequencies; this enables detecting highly suppressed EDR and HDR transmissions by locating a local maximum.

Figure 3:
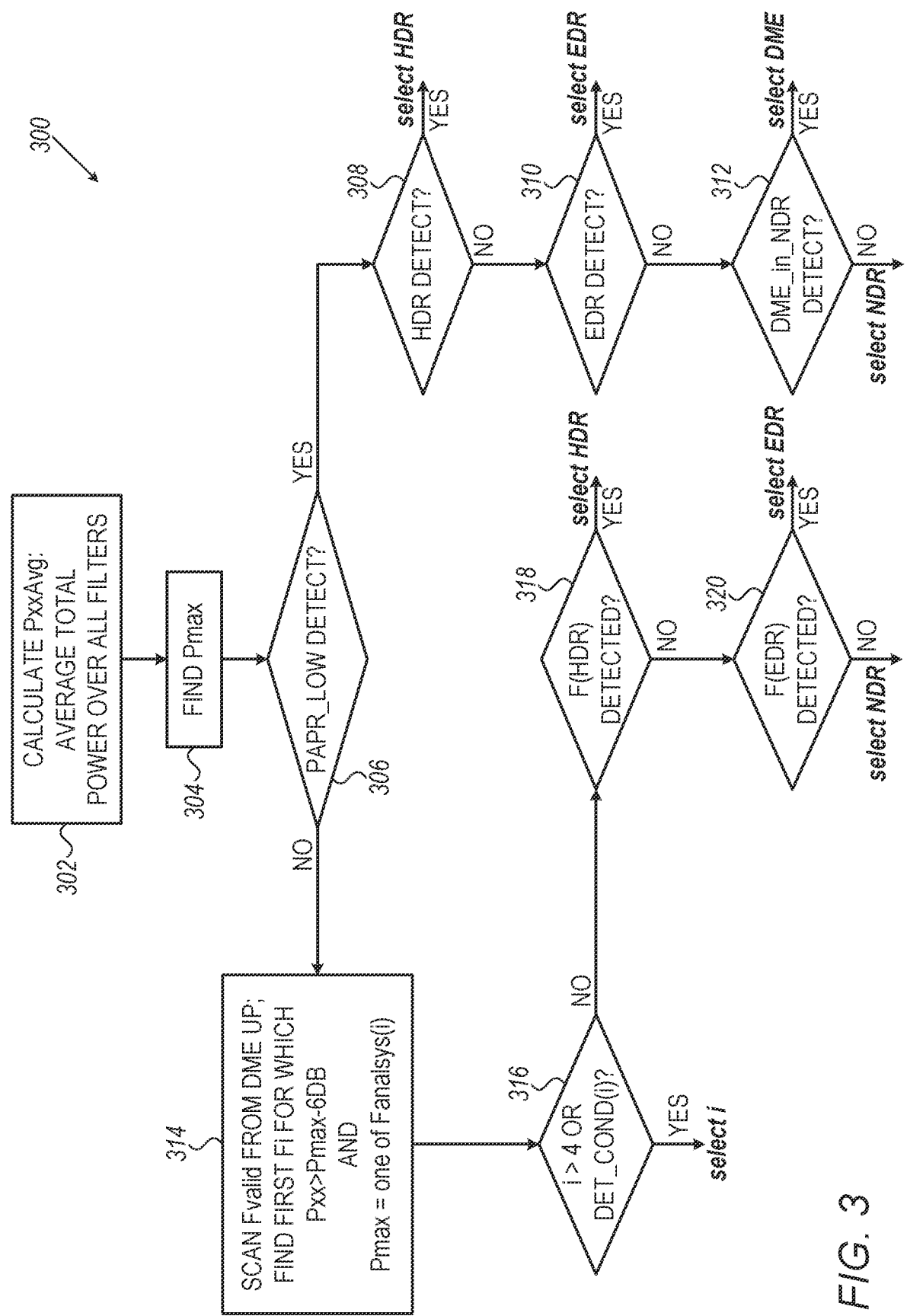
FIG. 3 is a flowchart that schematically describes a method for rate selection, in accordance with an embodiment of the present invention.

FIG. 3 is a flowchart 300 that schematically describes a method for rate selection, in accordance with an embodiment of the present invention. The flowchart is executed by Rate Selection circuit 118 (FIG. 1; will be referred to hereinbelow as "RSC"), responsively to PxxBlock and PxxBlockAvg power values that the RSC receives from the STE.

To simplify the description of flowchart 300, we first introduce a detection conditions table, which describes conditions that are referred to in the flowchart:

TABLE 3

| Detection Name | Detection Condition | Comments |
| --- | --- | --- |
| PAPR_LOW_DET | Pmax-PxxAvg < PAPR_LOW | Low PAPR condition for NDR (PAPR_LOW = 10 dB) |
| HDR_DET | (Phdr-PxxAvg > DET_TH_LOW & Phdr-Pedr > PAPR_LOCAL_HDR & Phdr-Pext > PAPR_LOCAL_HDR) | HDR is within Pavg range with a substantial local peak (DET_TH_LOW = −3 dB PAPR_LOCAL_HDR = 13 dB) |
| EDR_DET | (Pedr-PxxAvg > DET_TH_LOW & Pedr-Phdr > PAPR_LOCAL_EDR & Pedr-Pext > PAPR_LOCAL_HDR) | EDR is within Pavg range with a substantial local peak (PAPR_LOCAL_EDR = 10 dB) |
| EXT_DET | (Pext-PxxAvg > DET_TH_LOW & Pext-Pedr > PAPR_LOCAL_HDR & Pext-Phdr > PAPR_LOCAL_HDR) | Extended 25 GHz frequency is within Pavg range with a substantial local peak |
| DME_DET_IN_NDR | (Pdme-PxxAvq > DME_NDR_DET_TH & Plg-PxxAvg > DME_NDR_DET_TH & Psdr-PxxAvg > DME_NDR_DET_TH) | First three tones are substantially higher than PxxAvg-use lower TH in low PAPR |
| DET_COND (1) | (Pdme-PxxAvq > DET_TH_HIGH & Plg-PxxAvq > DET_TH_HIGH & Psdr-PxxAvg > DET_TH_HIGH) | First three tones are substantially higher than PxxAvg (DET_TH_HIGH = 8 dB) |
| DET_COND (2) | (Plg-PxxAvg > DET_TH_HIGH & Psdr-PxxAvq > DET_TH_HIGH & Pddr-PxxAvg > DET_TH_HIGH) | First three tones are substantially higher than PxxAvg |
| DET_COND (3) | (Psdr-PxxAvg > DET_TH_HIGH & Pddr-PxxAvg > DET_TH_HIGH & EXT_DET) | First two tones are substantial, and an extended condition is true |
| DET_COND (4) | (P2p5g-PxxAvq > DET_TH_HIGH & EXT_DET) | First tone is substantial, and an extended condition is true |

In Table 3 above, PAPR is the Peak to Average Power Ratio—the maximum power at any frequency divided by the average power.

Flowchart 300 starts at an Average-over-Frequencies step 302, wherein the RSC calculates the average power PxxAvg over all frequencies. Next, the RSC enters a Find-Pmax step 304, and finds the maximum power for any of the frequencies and then, in a Check PAPR_LOW step 306, detects a PAPR_LOW condition (as described in Table 3). According to the example embodiment illustrated in FIG. 3, step 306 is the main split of flowchart 300; the PAPR_LOW check is aimed mainly for the detection of NDR.

If, in step 306, the PAPR is low (PAPR_LOW detection is true), the RSC enters an HDR-Detect step 308, and checks the detect condition for HDR, according to the definition in Table 3. If the detection condition is true, the RSC selects the HDR rate, and the flowchart ends. If, in step 308, the detect condition is false, the RSC enters an EDR-Detect step 310, and checks the EDR-detection condition according to Table 3. If the condition is true, the RSC selects the EDR rate, and the flowchart ends.

If, in step 310, the condition is false (e.g., EDR is not detected), the RSC enters a Check-DME-in-NDR step 312 and checks for the DME-in-NDR condition according to Table 3. If the condition is true, the RSC selects the DME rate, and the flowchart ends. If the condition in step 312 is false, the default NDR rate is selected and the flowchart ends.

Steps 308 to 312 described above pertain to the case where the peak power is not substantially higher than the average power. If, in step 306, PAPR_LOW is not detected, the RSC enters a Find_First_Fi_with_Large_Pxx step 314, in which the RSC scans all valid frequencies Fvalid, from DME and up (with increasing frequencies), and looks for the first frequency for which the following two conditions are met: i) the power for the frequency Pxx is larger than Pmax by at least a preset limit (e.g., 6 dB); and, the energy of one of the frequencies Fanalysis corresponding to Fi (in Table 2) equals Pmax. When both conditions are met, the RSC enters a Check_i_GT_4_or_Det_COND step 316 and performs a check that is defined as follows:

Check=($i>4$)?true:DET_COND($i$)?true:false.

In the logic equation of step 316 above, i is the index of the frequency that was determined in step 314, and DET_COND(i) is a detection condition that is defined in Table 2 (DET_COND(1) through DET_COND(4) in the table; note that DET_COND(3) and DET_COND(4) comprises an EXT_DET condition, which is also defined in Table 3).

If the check of step 316 is true, the RSC selects a rate that corresponds to i, and the flowchart ends. If the check of step 316 is false, the RSC enters a Check-HDR step 318 and checks the HDR_Detect condition, according to Table 3. If the HDR detect condition is true, the RSC selects HDR and the flowchart ends. If, in step 318, the condition is false, the RSC enters a Check-EDR step 320 and checks the EDR_Detect condition, according to Table 3. If the EDR detect condition is true, the RSC selects EDR and the flowchart ends. If, in step 320, the condition is false, the RSC selects NDR and the flowchart ends.

In summary, rate selection flowchart 300 comprises calculating average powers, finding a maximum power and then split according to the PAPR level: if the PAPR is below a preset threshold, detect HDR, EDR or DME or, if all fail, default to NDR. If the PAPR is not below the threshold, scan the frequencies to find one sufficiently close to the maximum power and containing, in its Fanalysis, the frequency with the maximum power, and then detect the found frequency or, if not detected, detect HDR or FDR or. If neither is detected, default to NDR. All the detection conditions are described in Table 3.

Notes Pertaining to Flowchart 300

1. According to the example embodiment illustrated in FIG. 3, since NDR is beyond the Nyquist limit, NDR is selected by default, if no other rate is found. This may result in an ambiguity, because NDR will be selected also when no signal is received. In some embodiments, the ambiguity is resolved by an additional circuitry, configured to verify that the received signal power is above a predefined threshold.

2. The detection conditions of Table 2 rely on different comparisons between the computed PSD values. For example, the HDR detector compares the HDR power to PxxAvg, Pedr, and Pext. In this case, the comparison to PxxAvg is significantly improved by the addition of the EDR and the extended frequencies; in fact, in this case, the RSC performs a local-max based selection that significantly improves the robustness of the rate-selection flow across different channel models with varying degrees of IL (where high frequencies can be severely suppressed).

3. The split of the flowchart according to the PAPR level (in step 306) is mainly for distinguishing the NDR case, which is expected to be flat (without spectral lines) across the entire bandwidth. The PAPR in this case is defined as the difference (in dB) between the maximum power found for all possible frequencies and the average PSD over the entire bandwidth.

4. As shown, in the low PAPR case, the RSC may still select HDR, EDR or DME if any of the corresponding detection conditions is true. For HDR and EDR this may occur when there is a large IL causing the tone power for HDR or EDR to fall below the average. In this case, Pmax may belong to some other Fi, and, to rule out HDR or EDR, the RSC also checks if a local-peak condition exists.

The RSC may also select DME in the low PAPR case mainly because the repeating peaks every 0.3125 GHz lowers the PAPR. In this case, the DME detect condition checks for the significance of the first three frequencies in Fanalysis(DME) (Table 2).

5. In step 314, the RSC searches for the condition in all Fi∈Fvalid frequencies except NDR. The main test condition checks if the Fi power is within a predefined threshold from Pmax, and that Pmax belongs to one of the Fanalysis(Fi), as shown in Table 2.

As would be appreciated, flowchart 300 is an example embodiment that is cited merely for the sake of conceptual clarity. Rate selection according to the present invention is not limited to the description hereinabove. For example, in some embodiments, all test conditions of Table 2 are first checked, and then the selected frequency is read from a table that is indexed by a concatenation of all condition checks.

Rate Detection Method

We now present a complete method for the rate detection, which is based on the disclosures presented hereinabove.

Figure 4:
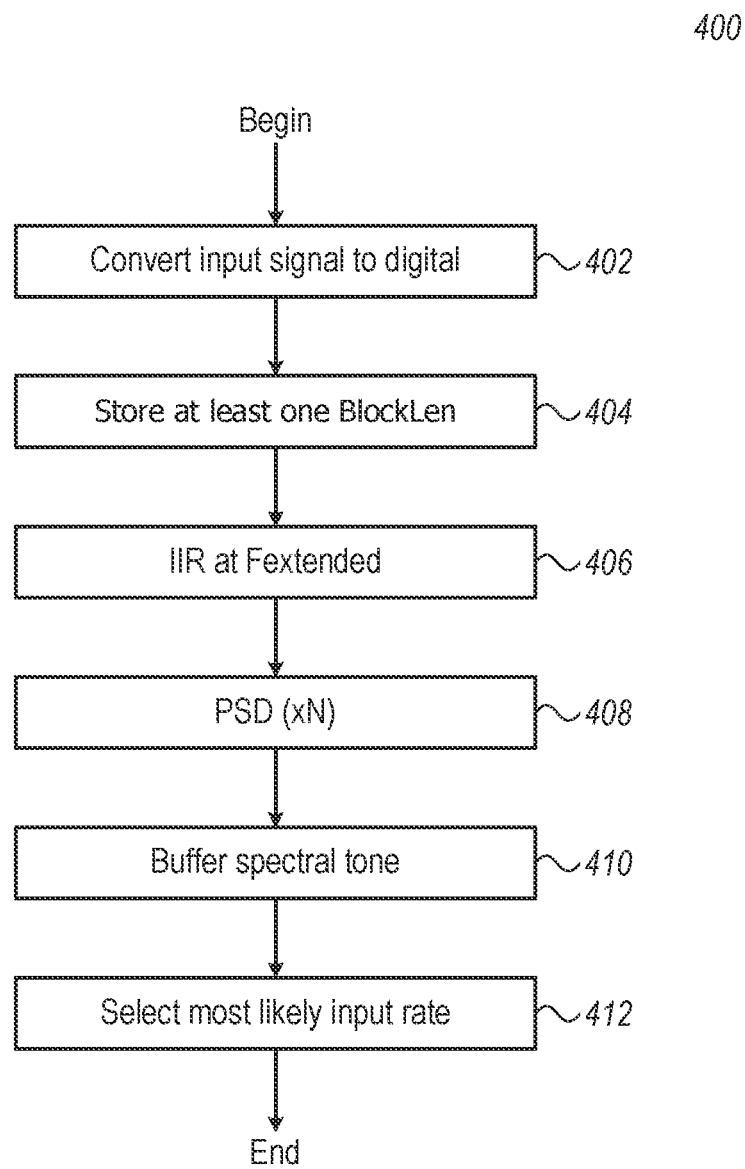
FIG. 4 is a flowchart that schematically describes a method for rate detection, in accordance with an embodiment of the present invention.

FIG. 4 is a flowchart 400 that schematically describes a method for rate detection, in accordance with an embodiment of the present invention. The flowchart is executed by rate-detecting receiver 100 (FIG. 1), and sub-circuits thereof. For brevity, we will refer to the rate-detecting receiver as RDR hereinbelow.

The method starts at a Convert-Signal, wherein an ADC (e.g., ADC 102, FIG. 1) of the RDR converts the input signal to digital format, at a conversion frequency (sampling frequency) Fs. Next, at a Store step 404, the RDR stores NumOfBlock blocks of the digital signal, each block with a length BlockLen, in a memory (e.g., RAM 106, FIG. 1). In an embodiment, NumOfBlocks=4 and BlockLen=2000.

The RDR then enters an IIR step 404, wherein the signal is band-pass filtered in Nextended (e.g., 13) different frequencies, using, for example, Nextended Goertzel filters. Next, at a PSD step 408, the RDR calculates a PSS of each of Nextended frequencies, for example, using a plurality of PSD calculators 204 (FIG. 2).

At a Buffer-Spectral-Tone step 410, the Rate-Detecting receiver temporarily stores a group of NumOfBlocks power signals, each power signal comprising the power of each of the Nextended frequencies in the corresponding block. Step 410 may also comprise calculating Power Values: i) NumOfBlocks PxxBlock vectors, each vector comprising N power values of the N frequencies; and ii) PxxBlockAvg—an N-size vector, denoting the average power of each frequency, over the NumOfBlocks blocks. Step 410 may be executed, for example, by Spectral Tone-Power buffer 206 (FIG. 2).

After step 410, the RDR enters a Select-Most-Likely-Frequency step 412, and selects, responsive to the PxxBlock and the PxxBlockAvg vectors, a most-likely input signal rate. In embodiment, step 412 may comprise executing flowchart 300 (FIG. 3).

As would be appreciated, flowchart 400 is an example embodiment that is cited merely for the sake of conceptual clarity. Rate detection according to the present invention is not limited to the description hereinabove. For example, in some embodiments, some of the steps described above may be executed concurrently. In an embodiment, execution may be pipelined, wherein a block of samples is stored while the most-likely frequency according to the previous block is assessed and, at a final step, the most likely frequency according to all blocks is determined.

Other Protocol Sets

In some embodiments, a different set of protocols with a different Fvalid set of corresponding frequencies may be used. Flowchart 300, table 2 and table 3 should be modified accordingly. An extended set of frequencies rather than a single extended frequency may be required to detect protocols with high insertion loss; and the extended frequencies should be selected so that for each frequency Fi, the extended frequency is the highest frequency below Nyquist which falls in the set of Fi ambiguous frequencies.

Thus, in some embodiments, RDA 108 adds extended frequencies for one or more protocols that are characterized by high insertion loss (e.g., an insertion loss that exceeds a defined threshold). For a given protocol whose fundamental frequency is Fi, RDA 108 may choose the (one or more) harmonics of Fi that fall below the Nyquist rate of the signal, to serve as the (one or more) extended frequencies.

The apparatuses and methods described hereinabove, with reference to FIGS. 1 through 4; the configurations of rate-detecting receiver 100, RDA 108 and all units and subunits thereof, are example configurations and methods that are shown purely for the sake of conceptual clarity. Any other suitable methods and configurations can be used in alternative embodiments.

In various embodiments, rate-detecting receiver 100 may be implemented using suitable hardware, such as one or more Application-Specific Integrated Circuits (ASIC) or Field-Programmable Gate Arrays (FPGA), or a combination of ASIC and FPGA.

In some embodiments, rate selection 118 circuit may comprise a general-purpose programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory. In other embodiments, rate selection circuit 118 may comprise a special-purpose processor; in yet other embodiments the rate selection may comprise dedicated hardware, or a combination of hardware and software.

Although the embodiments described herein mainly address rate detection in a digital receiver, the methods and systems described herein can also be used in other applications such as in clock-data recovery (CDR).

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A rate Detection Apparatus (RDA), comprising:
a power spectral density (PSD) estimator, configured to receive samples of a signal, and to estimate a PSD of the signal in multiple frequency slices that correspond at least to multiple expected transmission rates; and
a rate selector, configured to identify a transmission rate of the signal by selecting the transmission rate of the signal from among the expected transmission rates responsively to the estimated PSD.

2. The RDA according to claim 1, wherein the PSD estimator is further configured to estimate the PSD of the signal in one or more additional frequency slices that do not correspond to any of the expected transmission rates, and wherein the rate selector is configured to select the transmission rate depending on the PSD estimated in the one or more additional frequency slices.

3. The RDA according to claim 2, wherein the PSD estimator is configured to evaluate the one or more additional frequency slices for one or more of the expected transmission rates that are characterized by an insertion loss exceeding a defined threshold.

4. The RDA according to claim 2, wherein the PSD estimator is configured to specify the one or more additional frequency slices, for a given expected transmission rate, to one or more highest harmonics of the given expected transmission rate that fall below a Nyquist rate of the received signal.

5. The RDA according to claim 1, wherein the rate selector is further configured to identify a physical-layer (PHY) protocol of the signal based on the identified transmission rate.

6. The RDA according to claim 1, wherein the PSD calculator is configured to estimate a Peak-to-Average Power Ratio (PAPR) of the signal in at least one of the frequency slices, and wherein the rate selector is configured to identify the transmission rate depending on the PAPR.

7. The RDA according to claim 1, wherein the PSD estimator comprises multiple PSD calculators, each configured to receive power samples filtered around a respective frequency and to output an estimate of the PSD at the respective frequency.

8. The RDA according to claim 1, wherein the rate selector is configured to identify that the transmission rate is higher than a Nyquist rate of the signal.

9. A rate Detection Apparatus (RDA), comprising:
a power spectral density (PSD) estimator, configured to receive samples of a signal, and to estimate a PSD of the signal, wherein the PSD estimator comprises multiple Goertzel filters, each configured to receive power samples of the signal and to output the power samples filtered around a respective frequency; and
a rate selector, configured to identify a transmission rate of the signal responsively to the estimated PSD.

10. The RDA according to claim 9, wherein the rate selector is configured to identify the transmission rate responsively to a comparison among outputs of the Goertzel filters.

11. A rate Detection Apparatus (RDA), comprising:
a power spectral density (PSD) estimator, configured to receive samples of a signal, and to estimate a PSD of the signal over a measurement time period;
a rate selector, configured to identify a transmission rate of the signal responsively to the estimated PSD; and
a phase error injection circuit, which is configured to insert phase noise into the signal during the measurement time period.

12. A rate detection method, comprising:
receiving samples of a signal;
estimating a Power Spectral Density (PSD) of the signal in multiple frequency slices that correspond at least to multiple expected transmission rates; and
identifying a transmission rate of the signal by selecting the transmission rate of the signal from among the expected transmission rates responsively to the estimated PSD.

13. The method according to claim 12, wherein estimating the PSD comprises estimating the PSD of the signal in one or more additional frequency slices that do not correspond to any of the expected transmission rates, and wherein identifying the transmission rate comprises selecting the transmission rate depending on the PSD estimated in the one or more additional frequency slices.

14. The method according to claim 13, wherein selecting the transmission rate comprises evaluating the one or more additional frequency slices for one or more of the expected transmission rates that are characterized by an insertion loss exceeding a defined threshold.

15. The method according to claim 13, wherein selecting the transmission rate comprises specifying the one or more additional frequency slices, for a given expected transmission rate, to one or more highest harmonics of the given expected transmission rate that fall below a Nyquist rate of the received signal.

16. The method according to claim 12, further comprising identifying a physical-layer (PHY) protocol of the signal based on the identified transmission rate.

17. The method according to claim 12, wherein identifying the transmission rate comprises estimating a Peak-to-Average Power Ratio (PAPR) of the signal in at least one of the frequency slices, and identifying the transmission rate depending on the PAPR.

18. The method according to claim 12, wherein estimating the PSD comprises providing power samples of the signal to multiple Goertzel filters, and outputting, from each of the Goertzel filters, the power samples filtered around a respective frequency.

19. The method according to claim 18, wherein identifying the transmission rate comprises comparing among outputs of the Goertzel filters.

20. The method according to claim 12, wherein estimating the PSD comprises applying multiple PSD calculators to each receive power samples filtered around a respective frequency and output an estimate of the PSD at the respective frequency.

21. The method according to claim 12, wherein estimating the PSD comprises estimating the PSD over a measurement time period, and further comprising inserting phase noise into the signal during the measurement time period.

22. The method according to claim 12, wherein identifying the transmission rate comprises identifying that the transmission rate is higher than a Nyquist rate of the signal.

\* \* \* \* \*